United States Patent Office 3,536,895
Patented Oct. 27, 1970

3,536,895
**METHOD AND APPARATUS FOR THE AUTO-
MATIC EVALUATION OF CURVES**
Hubert Dedden, Leichlingen, and Heinrich Nassenstein,
Leverkusen, Germany, assignors to Farbenfabriken
Bayer Aktiengesellschaft, Leverkusen, Germany, a corporation of Germany
Filed July 20, 1964, Ser. No. 383,723
Claims priority, application Germany, July 22, 1963,
F 40,296
Int. Cl. G06k 11/00
U.S. Cl. 235—61.6
10 Claims

ABSTRACT OF THE DISCLOSURE

Automatic evaluation of a multiplicity of curves on a graph by relating a binary scanning signal to a binary marker signal through a logical circuit, including means for representing length of curve and area under a curve as a number of pulses and means for storing, cumulating and reporting pulses.

---

The invention relates to a method and to an apparatus for the automatic evaluation of curves, in which the sections and surfaces to be measured are periodically scanned in strips and the heights of the curves are represented as a number of oscillations of a standard frequency.

With the prior known methods, automatic curve evaluation consists in either guiding a measuring head along the line of the curve (as with a curve follower) the co-ordinates of the position being produced as data, or the measuring head being manually adjusted to the next point of the line of the curve and the co-ordinates thereof then being automatically produced, or that the surfaces or areas beneath a curve are scanned by a scanning method and the size of the curve is then produced. However, by means of the prior art it is not possible for several curves or curved surfaces on a diagram (whether they are in juxtaposition or superimposition) to be evaluated in a fully automatic manner, that is to say, for the required data to be derived and produced automatically from a plurality of curves.

Under these conditions, with the curve follower, it would be necessary for the measuring head to be adjusted manually to the start of the new curved line, since to arrange for the automatic searching of the measuring head for the next curve would involve an unacceptably heavy expenditure for equipment. The scanning method is complicated by the ambiguous nature of the scanning signal which does in fact, in each scanning period, contain information from all the curved lines travelled over, including the defects which occur in practice, such as specks or gaps in the curve. In addition, it is necessary for the instrument, during the scanning of the diagram surface, to recognise automatically the beginning and end of curves or areas which are to be measured.

It has now been found that the possibilities of decision between the information contained in the scanning signal is substantially improved, if, according to the invention, additional signals are produced with the aid of markings which make it possible for the bits of information to be counted, arranged, separated from one another and for the desired information to be selected by decisions during each scanning period, in a logic circuit.

Embodiments of arrangements for carrying the method into effect are shown diagrammatically and by way of example in the drawings.

Figure 1:
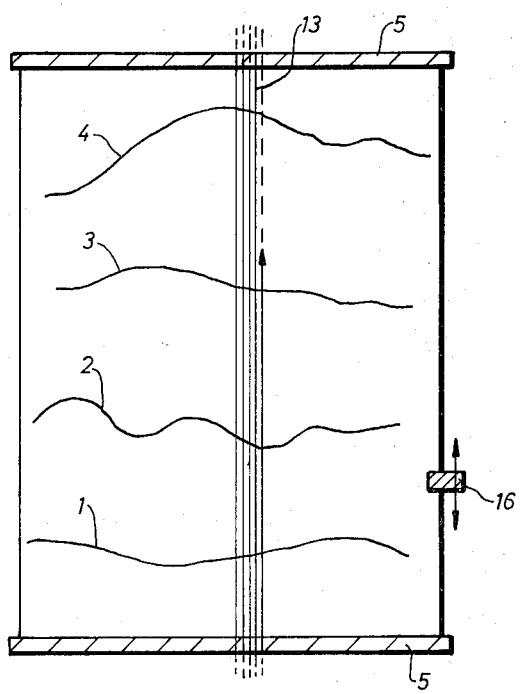
FIG. 1 shows a graph with four curves which are to be evaluated.
Figure 2:
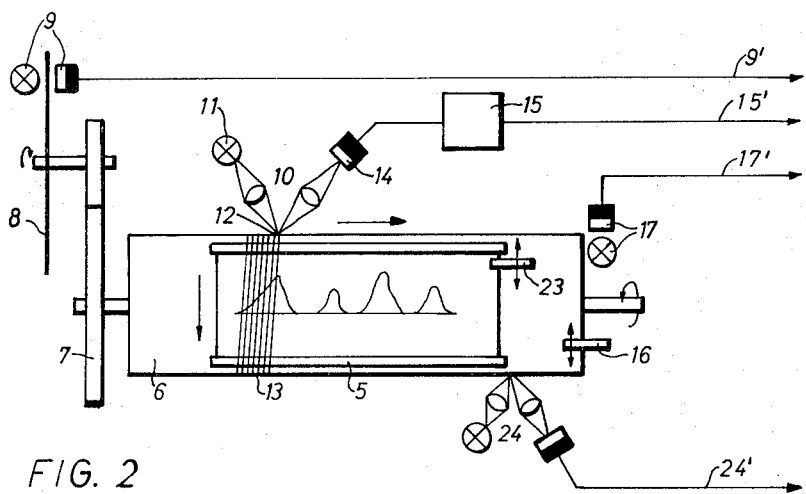
FIG. 2 shows a scanning device with two marking devices.

By way of example, a diagram as in FIG. 1, on which are arranged a plurality of curves 1, 2, 3 and 4 is clamped by means of a holder device 5 on the roller 6 in FIG. 2, which is set in rotation and drives an apertured disc 8 through the gearing 7. A light barrier 9 generates pulses 9′, which are referred to herein as apertured disc pulses, the frequency of which is synchronised with the speed of the roller and represents the standard frequency, and the number of which is fed to the logic circuit as a standard for the sections to be measured on the surface of the roller or cylinder. Simultaneously, a photoelectric scanning device 10 is moved along the surface of the cylinder and parallel to the cylinder axis at a speed which is synchronised with the cylinder rotation. A spot of light 12 projected by a light source 11 on to the cylinder surface controls a photoelectric cell 14 according to the reflection properties of the cylinder surface and the position of a scanning raster 13, and the electric signals of the said cell, which are here referred to as the scanning signal, are supplied, after conversion into pulses in a pulse former 15, as a binary signal 15′ to a logic circuit. By making the surface of the roller 6 in FIG. 2 reflective, it is possible to evaluate transparent curves. Light beams arriving from the light source 11 pass twice through the transparent graph lying on the reflecting surface before they are intercepted by the photo cell 14. The increasing contrast which is thereby obtained substantially improves the scanning signal.

Figure 3:
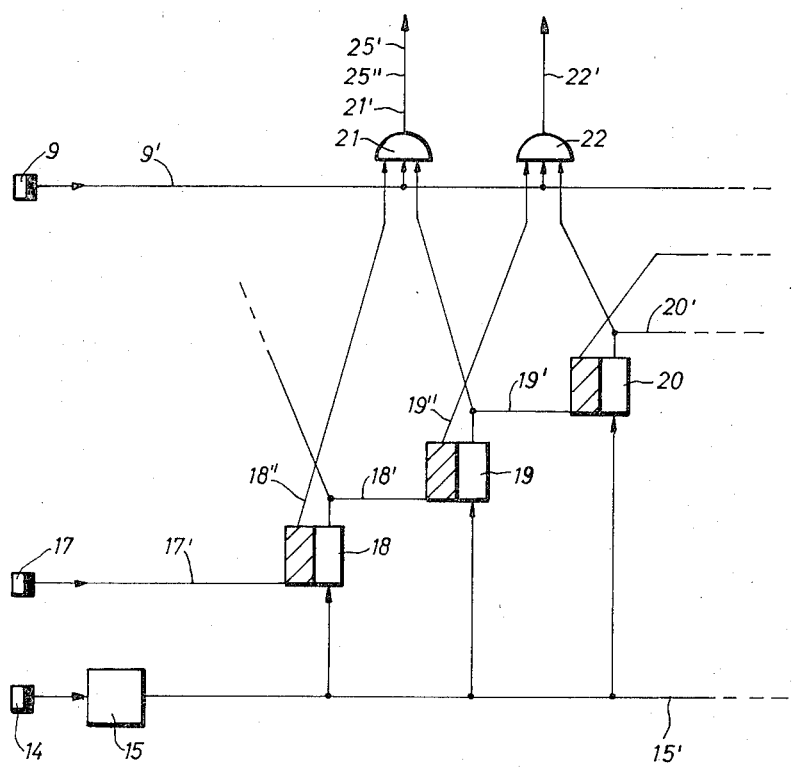
FIG. 3 illustrates a logic circuit connected to the scanning device shown in FIG. 2.

A displaceable index 16 is fixed on a margin of the cylinder and generates in a light barrier 17 a pulse 17′, referred to herein as marking signal, which is likewise fed to the logic circuit. The index or marking 16 which, as indicated by an arrow in FIG. 1, can be set in the scanning direction to any arbitrary ordinate value on the graph, serves as starting point for the counting of the pulses which correspond in the scanning signal 15′ to the curve lines travelled over. Another displaceable index 23 is arranged on a margin of the cylinder and generates a second marking signal 24′ by means of a scanning device 24. FIG. 3 shows a circuit diagram of the logic circuit and FIG. 4 a time diagram of the signals used in the circuit. The marking signal 17′ coming from the light barrier 17 sets a flip-flop chain 18, 19, 20 in the starting position, which is expressed in FIG. 4 by the binary signals 18′, 19′, 20′ and 18″, and 19″.

Figure 4:
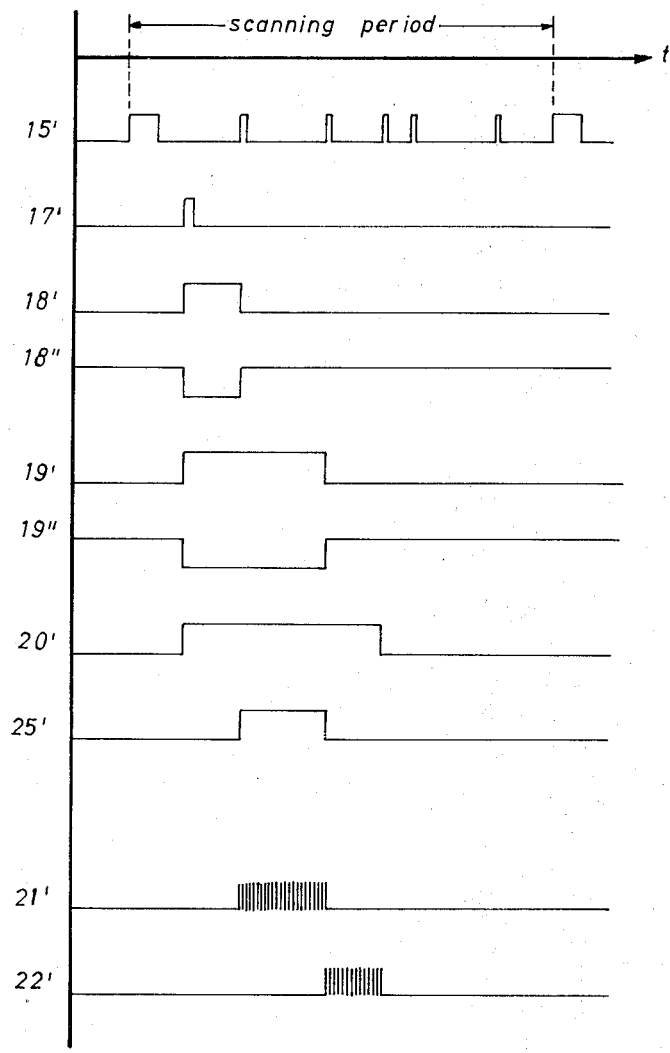
FIG. 4 shows a time diagram for the logic circuit shown in FIG. 3.

The binary scanning signal 15′ is fed to all flip-flops and the pulses contained therein throw the flip-flops into a stable position according to the sequence in which they occur, this position not being disturbed by further pulses and only being moved with the resetting by the marking signal 17′ in the scanning period. If now the flip-flop signals 18 and 19 in an "AND" gate 21 and the flip-flop signals 19″ and 20″ in an "AND" gate 22 are linked with the apertured disc pulses 9′, as shown in FIGS. 3 and 4, the pulse series 21′ and 22′ occur at the outputs of the gates 21 and 22, in which series the number of the pulses corresponds to the spacing between the first and second curved line and between the second and third curved line, respectively. If the binary signals 18', 19' and 20' are individually linked to the apertured disc pulses 9', then impulse series are obtained in which the number of the pulses corresponds to the distance of the marking or index 16 to the first, second, or third curved line. By expanding the flip-flop and gate chain, it is possible for the number of distances measured in each scanning period to be increased as required. By displacement of the index 16, whether manually or automatically through a control device, it is now possible to select from a group of curves, the required curves or the required spacings between two curves.

Figure 5:
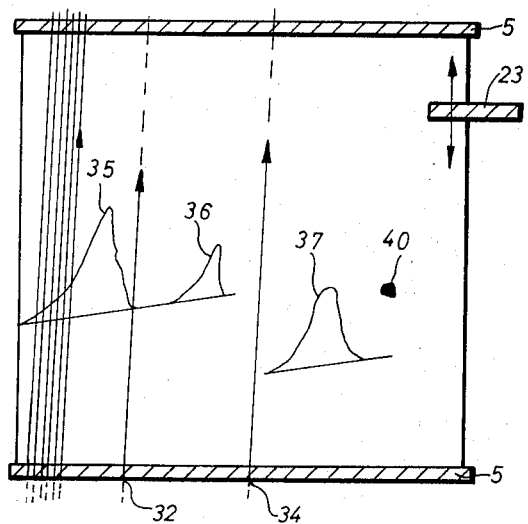
FIG. 5 shows a graph with three closed curves which are to be separately interpreted.
Figure 6:
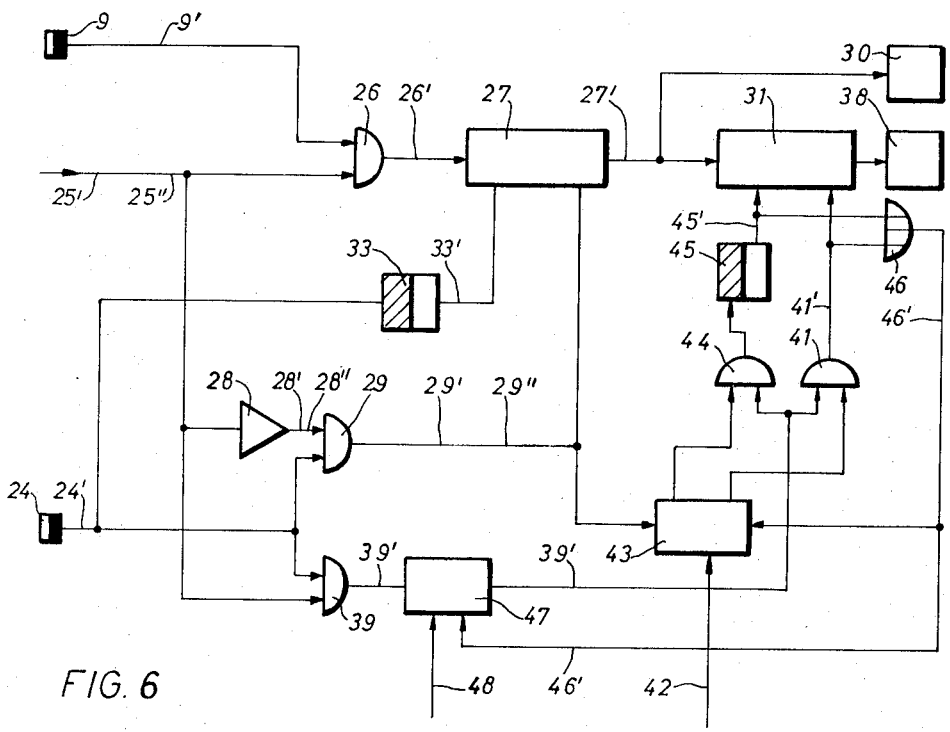
FIG. 6 shows a further development of the logic circuit connected to the scanning device shown in FIG. 2

As an example of the automatic detection of the beginning and end of the curve or area to be measured, FIG. 5 shows a graph such as frequently obtained for example in connection with gas chromatograms. The displaceable index 23 is so arranged that the marking signal 24' is set up in the photocell 24 of FIG. 2, this signal following as a function of time the binary signal 25' in FIGS. 6 and 7, which has been derived from the scanning signal 15', for example as described in the preceding example, and the duration of which corresponds to the length of the section to be measured. The binary signal 25' opens the gate switch 26 in FIG. 6 and thus produces with the aid of the apertured disc pulses 9' a series of pulses 26', of which the number of pulses is received by the storage device 27 as a standard for the measured length. In the negator 28, the binary signal 25' is converted and conjunctively linked as negation 28' in the "AND" gate 29 with the marking signal 24'. With non-coincidence of 24' and 28', the output signal 29', as an interrogating signal, can interrogate the contents of the storage device 27 for transmission to the delivery device 30 or for transmission to another storage device, here referred to as the summation store 31.

Figure 7:
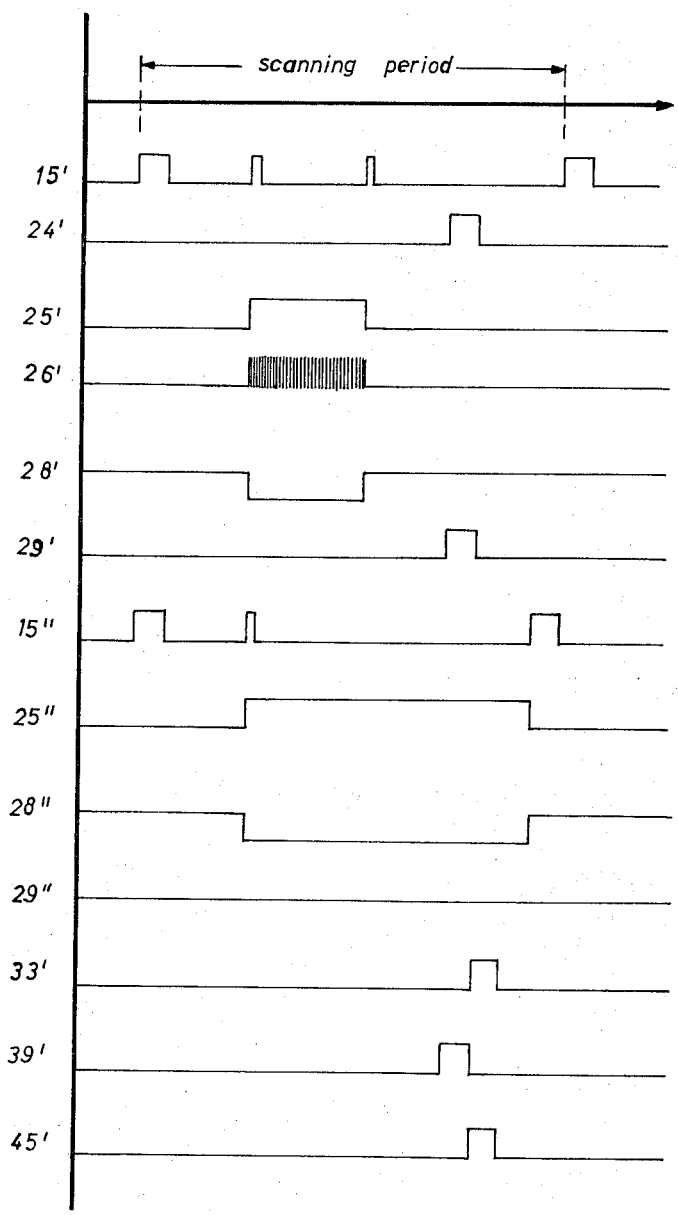
FIG. 7 shows a time diagram for explaining the logic circuit shown in FIG. 6.

If the scanning device is situtated during the constant scanning operation on a scanning line which only intersects a curve, for example 32 in FIG. 5, then in this scanning period, there is obtained the scanning signal 15" in FIG. 7, from which are formed the signals 25", 28" and 29", corresponding to the circuit diagram and time diagram. During this scanning period, no interrogating signal 29' is formed, since the signals 24' and 28" coincide. The contents of the storage device 27 is consequently not interrogated and are erased by the erasing pulse 33', which is produced from the marking signal 24' with a time delay during each scanning period of the monoflop 33.

If the scanning device during the constant scanning operation is located on a scanning line which does not intersect any curve, for example 34 in FIG. 5, no pulse series 26' is obtained in this scanning period and the contents of the storage device 27 remain zero.

In order that the curve-evaluating instrument automatically covers the areas 35, 36 and 37 and delivers separately into the delivery device 38, all lines 27' interrogated by the storage device 27 are added in the summation store 31 and interrogated by another interrogation signal 39', which is only set up if a marking signal 24' and binary signal 25" coincide in the "AND" gate 39.

In practice, there are frequently specks on the graphs, but these specks are generally smaller than the areas to be measured. Such a disturbing speck 40 is indicated in FIG. 5. In the scanning, the number of the successive scanning periods during which the specks are contained as "curve lines" in the scanning signal 15' remains limited. If now the interrogating signal 39' in the "AND" gate 41 is blocked until the number of noncoincidence positions 29' established in the "AND" gate 29 is larger than a number set by the preselecter 42 in the counter 43, it is only an interrogating signal 39' which occurs later than can pass the contents of the store 31 to the delivery device 38. If the interrogating signal 39' occurs prematurely, it is used by the "AND" gate 44, which is controlled by the counter 43, and delayed by the monoflop 45, as an erasing pulse 45' for erasing the storage device 31.

Both the erasing signal 45' and the interrogating signal 41', originating from the interrogating signals 39', are disjunctively connected in the "OR" gate 46 and used as resetting signal 46' for the counter 43.

In practice, it also occasionally happens that the curved lines to be evaluated show small breaks due to defects in the writing or recording apparatus and these breaks could also lead to a disturbance of the curve evaluation, so that for example several partial surfaces would be emitted instead of a continuous surface. This can be prevented if, for example, the interrogating pulse 39' is only passed on if the number of coincidence positions occurring in the "AND" gate 39 is larger in the counter 47 than a number which is set by the preselecting device 48.

The marking of indices required for fully automatic curve evaluation can be provided in various ways, either by using the holding device for the graph or a curved line which is on the graph or by using a counter which is fed by the normal frequency generator and emits a marking signal, according to the setting of the preselector, during each scanning period and during the overtravel.

A completely automatic curve-evaluating arrangement according to the invention can be used when evaluating gas chromatograms, oscillograms and energy diagrams and also as analogue digital converters for introducing graphical functions into electronic calculating machines.

We claim:

1. Method of evaluating graphs having a multiplicity of curves thereon which comprises periodically scanning said graph stripwise; producing a binary scanning signal; measuring the number of oscillations of a standard frequency of said signal which are representative of the lengths of said curve and the area underneath said curve; producing a binary marker signal independent of said scanning signal; logically connecting said marker signal to said scanning signal and with said oscillations whereby to produce trains of pulses, which pulses correspond to the length of curve scanned; and selecting a particular train of pulses during each scanning period by reference to the position of said marking signal with respect to said scanning signal.

2. Method as claimed in claim 1, wherein the number of pulses are stored and wherein during each scanning period a binary signal related to the marker signal is produced associated with the scanned length; whereby, in the event of non-coincidence of said two signals, the number of stored pulses is reported and, in the event of coincidence of said two signals, the number of stored pulses is erased.

3. Method as claimed in claim 2, wherein under conditions of non-coincidence, the number of pulses stored is added to the sum of said pulses in storage and the total sum of pulses is reported upon the next succeeding coincidence of said two signals.

4. Method as claimed in claim 3, wherein said total sum of pulses is reported only where the number of successive non-coincidences is greater than a predetermined number and wherein the sum total in storage is erased when the next sucessive coincidence is after less than said predetermined number.

5. Method as claimed in claim 4, wherein said sum total in storage is reported only when the number of successive coincidences is greater than a predetermined number.

6. Apparatus comprising base means adapted to hold a graph having a multiplicity of curves thereon; scanning means associated with said base means; frequency generation means operatively connected to said scanning means having a frequency synchronized with the scanning frequency; a first and second adjustable marker means on said scanning means; means connecting said first marker means to a chain of flip-flop stages; means connecting said second marker means to a logical circuit through gates, negators, and flip-flop stages; means operatively associated with said scanning means adapted to control said chain of flip-flop stages; output means containing storage means operatively associated with said flip-flop stages of said logical circuit; means connecting the outputs of said chain of flip-flop stages to said frequency generator through and-gates; and means simultaneously coupling said logical circuit to said scanning means and to said frequency generator.

7. Apparatus as claimed in claim 6, wherein said first adjustable marker means is a rail which is displaceable parallel to the coordinate axes of said curves.

8. Apparatus as claimed in claim 6, wherein said first adjustable marker means has the shape of one of said curves.

9. Apparatus as claimed in claim 6, wherein said first adjustable marker means is represented by preselection of an adjustable counter connected to said generator.

10. Apparatus as claimed in claim 6, including roller means supporting said graph and having a reflective surface.

References Cited

UNITED STATES PATENTS

| | | | |
|---|---|---|---|
| 2,868,449 | 1/1959 | Brinister et al. | 235—61.6 |
| 2,879,937 | 3/1959 | Coles et al. | 235—61.6 |
| 2,961,547 | 11/1960 | Snavely | 235—61.6 |
| 3,034,710 | 5/1962 | Archer | 235—61.6 |
| 3,259,733 | 7/1966 | Klaver et al. | 235—61.6 |
| 3,165,730 | 1/1965 | Robinson | 340—347 |

DARYL W. COOK, Primary Examiner

U.S. Cl. X.R.

250—219